United States Patent
Balasubramanian et al.

(10) Patent No.: US 11,106,675 B2
(45) Date of Patent: Aug. 31, 2021

(54) SYSTEM AND METHOD FOR IDENTIFYING OPTIMAL TEST CASES FOR SOFTWARE DEVELOPMENT

(71) Applicant: ATOS Syntel, Inc., Troy, MI (US)

(72) Inventors: Padmanabhan Balasubramanian, Siruseri (IN); Indumathi Balaji, Siruseri (IN); Yogeswari Radha, Siruseri (IN)

(73) Assignee: ATOS SYNTEL INC., Troy, MI (US)

( * ) Notice: Subject to any disclaimer, the term of this patent is extended or adjusted under 35 U.S.C. 154(b) by 309 days.

(21) Appl. No.: 16/437,797

(22) Filed: Jun. 11, 2019

(65) Prior Publication Data

US 2019/0377736 A1 Dec. 12, 2019

Related U.S. Application Data

(60) Provisional application No. 62/683,898, filed on Jun. 12, 2018.

(51) Int. Cl.
*G06F 16/00* (2019.01)
*G06F 16/2455* (2019.01)
*G06F 16/28* (2019.01)
*G06F 16/2457* (2019.01)
*G06F 11/36* (2006.01)
(Continued)

(52) U.S. Cl.
CPC .... *G06F 16/24553* (2019.01); *G06F 11/3684* (2013.01); *G06F 11/3692* (2013.01); *G06F 16/24578* (2019.01); *G06F 16/285* (2019.01); *G06F 40/247* (2020.01); *G06F 40/284* (2020.01)

(58) Field of Classification Search
CPC .. G06F 40/284; G06F 40/247; G06F 11/3672; G06F 11/3676; G06F 11/3684; G06F 11/3692; G06F 16/353; G06F 16/285
See application file for complete search history.

(56) References Cited

U.S. PATENT DOCUMENTS 8,914,366 B1 * 12/2014 Li .................. G06K 9/6218
707/737
2003/0069880 A1 * 4/2003 Harrison ............. G06F 16/3334
2005/0234879 A1 * 10/2005 Zeng .................. G06F 16/3322
(Continued)

FOREIGN PATENT DOCUMENTS

IN 201711010066 3/2017
WO 2018060777 A1 4/2018

OTHER PUBLICATIONS

Search Report dated Dec. 2, 2019 in corresponding European Application No. 19 179 343.9.

*Primary Examiner* — Leslie Wong
(74) *Attorney, Agent, or Firm* — Arc IP Law, PC; Joseph J. Mayo

(57) ABSTRACT

A test case identification system that may tokenize natural language input and correlate the resultant set of tokens to a plurality of test cases for identification of a test case from the plurality of test cases. The identified test cases may be scored based upon historical information, quantification metrics and number of search token matches in order to identify a test case to a user. The results of the tokenization, correlation and identification may be stored in a master library for utilization in future identification efforts.

20 Claims, 6 Drawing Sheets

(51) Int. Cl.
   *G06F 40/247* (2020.01)
   *G06F 40/284* (2020.01)

(56) References Cited

U.S. PATENT DOCUMENTS

| | | | |
|---|---|---|---|
| 2012/0023399 A1* | 1/2012 | Hoshino | G06F 40/211 |
| | | | 715/256 |
| 2012/0173931 A1* | 7/2012 | Kube | G01R 31/3181 |
| | | | 714/37 |
| 2013/0124474 A1* | 5/2013 | Anderson | G06F 16/24534 |
| | | | 707/634 |
| 2013/0124524 A1* | 5/2013 | Anderson | G06F 16/24534 |
| | | | 707/737 |
| 2013/0263089 A1* | 10/2013 | Banerjee | G06F 11/3684 |
| | | | 717/124 |
| 2014/0059030 A1 | 2/2014 | Hakkani-Tur et al. | |
| 2016/0210224 A1* | 7/2016 | Cohen | G06F 9/44589 |
| 2017/0011043 A1* | 1/2017 | Musuluri | G06F 16/313 |
| 2017/0024311 A1* | 1/2017 | Andrejko | G06F 11/3684 |
| 2017/0199811 A1* | 7/2017 | Narayan | G06N 20/00 |
| 2018/0129594 A1* | 5/2018 | Singi | G06F 11/00 |
| 2018/0329807 A1* | 11/2018 | Atyam | G06F 11/3684 |
| 2018/0349256 A1* | 12/2018 | Fong | G06F 40/35 |
| 2019/0005151 A1* | 1/2019 | Moore | G06F 16/907 |
| 2019/0065576 A1* | 2/2019 | Peng | G06F 16/22 |
| 2019/0079853 A1* | 3/2019 | Makkar | G06F 8/71 |
| 2019/0196948 A1* | 6/2019 | Raman | G06F 16/9024 |
| 2021/0150204 A1* | 5/2021 | Enuka | G06K 9/00449 |

* cited by examiner

SYSTEM AND METHOD FOR IDENTIFYING OPTIMAL TEST CASES FOR SOFTWARE DEVELOPMENT

CROSS-REFERENCE TO RELATED APPLICATIONS

This application claims the benefit of U.S. provisional application No. 62/683,898, filed Jun. 12, 2018 (the '898 application). The '898 application is hereby incorporated by reference as though fully set forth herein.

BACKGROUND a. Technical Field

The present disclosure relates generally to software development, and specifically to a method and system for identifying an appropriate test case from a test case repository comprising a plurality of stored test cases.

b. Background Art

This background description is set forth below for the purpose of providing context only. Therefore, any aspects of this background description, to the extent that it does not otherwise qualify as prior art, is neither expressly nor impliedly admitted as prior art against the instant disclosure.

In software development, there is a desire to interpret instructions, requirements, or change requests in a manner that allows the software development requirements contained in such instructions, requirements, or change requests to be quickly and efficiently implemented. Implementing software requirements is commonly verified by the execution of an appropriate test case. These test cases may be pre-determined and stored in a test case repository.

However, software development requirements can manifest in a variety of different forms. Requirements may be submitted by a variety of personnel, who may have different language patterns and varying amounts of knowledge of technical terms and nomenclature. Even among a group of users who share similar positions and levels of experience, development requests can be submitted in wildly different forms. As a result, it can be difficult to identify which test case is appropriate for a given request or whether there exists an appropriate test case at all. Additionally, a request can return a wide number of test cases, whereby it is difficult to determine which test case is most appropriate for the request.

Therefore, there is a need for solutions that allow normalized interpretation of inputs containing requirements for software development for identification of the pre-determined test case within a test case repository containing a plurality of test cases. The foregoing discussion is intended only to illustrate the present field and should not be taken as a disavowal of claim scope.

SUMMARY

In an embodiment, a method of applying natural language processing ("NLP") techniques to pre-process the text contained in inputs to remove the non-valuable terms is disclosed. Continuing in this embodiment, the pre-processed text is tokenized and an N-gram technique is applied to parse the content and generate precise tokens in the form of a set of tokens. These tokens, along with base knowledge information, are analyzed and prioritized by a logic engine. The prioritized tokens are considered for comparison against other sets of tokens associated with a plurality of pre-determined test cases stored in a test case repository to identify a variety of test cases by relevancy matching to the input The variety of test cases are then scored according to a number of metrics associated with the set of tokens and test cases, including pre-determined metrics such as match percentage, weightage, utilization rates of the tokens and test cases as well as user-defined metrics. The relevant test cases are then ranked according to their scores and presented to the requestor or user. Data and metrics relating to the matching, retrieval, and acceptance of test and tokens are stored for use in future unsupervised analytics sessions to identify test cases.

An advantage of the embodiments described in this document is the identification of relevant test cases from normalized keywords that allows easy and efficient method of verifying the implementation of requirements in a software development effort. The foregoing and other aspects, features, details, utilities, and advantages of the present disclosure will be apparent from reading the following description and claims, and from reviewing the accompanying drawings.

DETAILED DESCRIPTION

Figure 1:
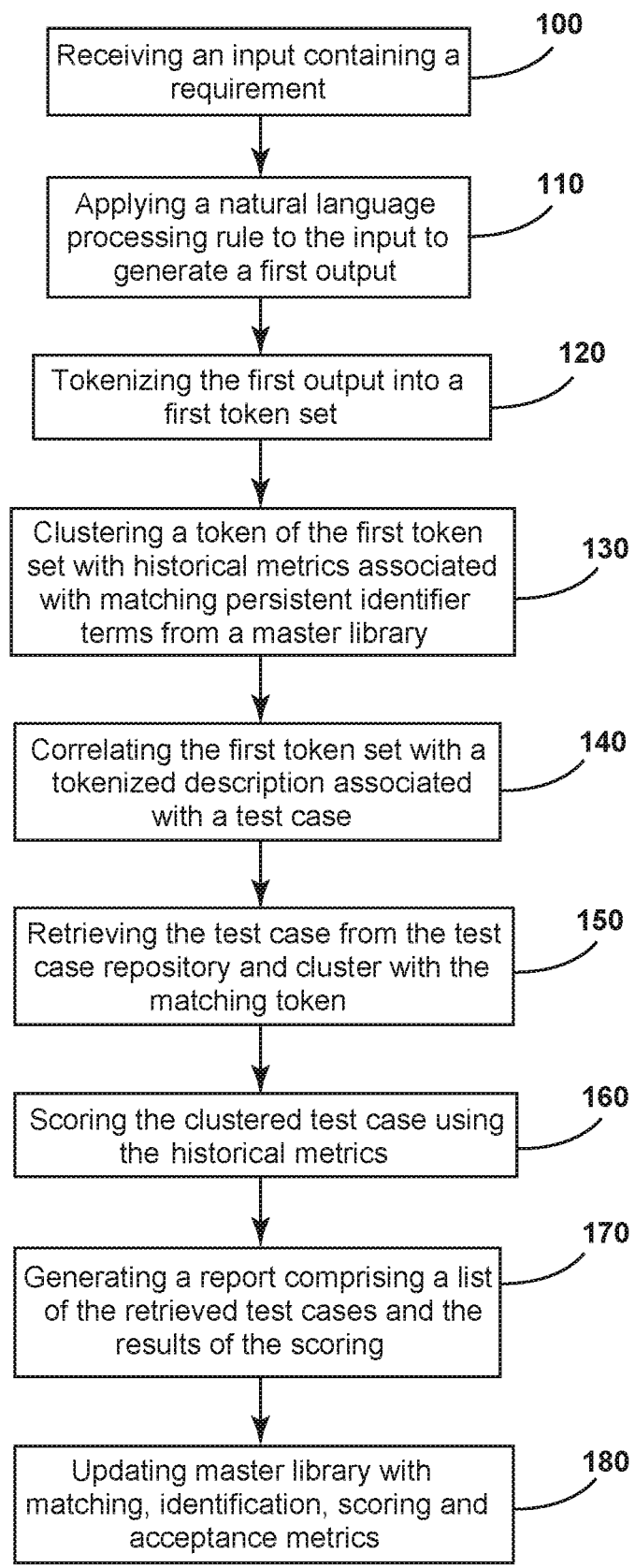
FIG. 1 is an overview of an embodiment for the utilization of a smart test case mapping system.

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment," or the like, means that a particular feature, structure, or characteristic described in connection with the embodiment is included in at least one embodiment.

Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

Before discussing the smart test case mapping system in detail, a general overview of natural language processing ("NLP") will first be set forth in order to provide context in regard to the tokenization of input requirements. Generally, NLP and machine learning allows communication between a human user and a computer and may be utilized to normalize the human input and allow a predictable and correct response from the computer.

Computers interact with humans in programming languages that are unambiguous, precise and structured. However, human (or "natural") language contain much ambiguity and can take many forms and syntax. Therefore, NLP techniques are employed to normalize input and enable a computer to "understand" human language.

N-gram models are often utilized in the art to normalize natural human language, and may be utilized in one embodiment in the present inventive method. N-gram models are contiguous sequences of an "n" number of items from a given input of text. In the art, a list of N-grams may be constructed by finding pairs of words that occur next to each other. For example, given the input text of "a quick brown fox jumped over the lazy dog," the example N-grams [('quick', 'brown'), ('fox', 'jumped'), ('the', 'lazy')] may be generated. The preceding are referred to "bigrams" due to the inclusion of two words per N-gram. Monograms from the same input would be [('quick'), ('brown'), ('fox'), ('jumped'), ('the'), 'lazy')]. Similarly, trigrams, quadgrams, all of the way up to "n"-grams may be generated from the same input.

N-grams may be used to quantify the likelihood of certain word pairings existing. Therefore, one practical application of N-grams is that, given a large enough corpus of text, a computer may be able to predict common word pairings. Another application of N-grams is to convert an input of natural language text into a set of tokens, such as list of monograms, that may be interpreted by a computer.

Before proceeding to a detailed description of a smart test case mapping system, an overview description of such a system will first be described. This document will also describe various embodiments for implementing the system.

Referring now to the drawings wherein like reference numerals are used to identify identical or similar components in the various views, FIG. 1 is a flow chart view of the configuration of one of the embodiments of the smart test case mapping system. As described in an embodiment, existing software development requirements and test cases are processed as part of a machine learning effort in order to develop associations and cluster records as well as to identify and build a corpus comprising persistent terms (N-gram tokens), custom stop-words and domain synonyms to be stored as part of a master library.

At 100 the system receives an input containing a software development requirement. This input may be in natural human language. At 110, the input containing the requirement is subject to a natural language processing rule by a natural language processing software module. This rule may include noise reduction, spell checking, or other language normalization techniques. The application of the natural language processing rule results in a first output. At 120, the first output is converted to a set of tokens through tokenization. This first output may be a first set of tokens containing a plurality of search tokens.

Within an analytics software module, at 130, the tokens may be referenced against a master library within a knowledge base containing persistent terms. The persistent terms may have associated historical data, quantification factors, usage information, or other metrics. If a token matches a persistent terms, the associated metrics may form a cluster around the token.

Continuing at 140, the first set of tokens may be correlated to another set of tokens associated with pre-determined test cases that are stored in a test case repository. Any matched test cases may be retrieved from the test case repository 150 and clustered with the matching token. The correlated test cases may then be scored at 160 based upon the number of search token matches between the two set of tokens, as well as the historical data, quantification factors, usage information, or other metrics retrieved with the persistent term. Further, at 170 through a reporting software module, a report may be generated to report to the user the matched test cases, any scoring and the application of the quantification factors or other metrics.

At 180, metrics from the analytics process, such as token matches, test case retrieval, test case scoring and user acceptance of scored test cases is stored in the master library within the knowledge base. Stored metrics associated with the persistent terms may be updated based upon the new metrics.

The foregoing embodiments solve one or more problems known in the art.

Figure 2:
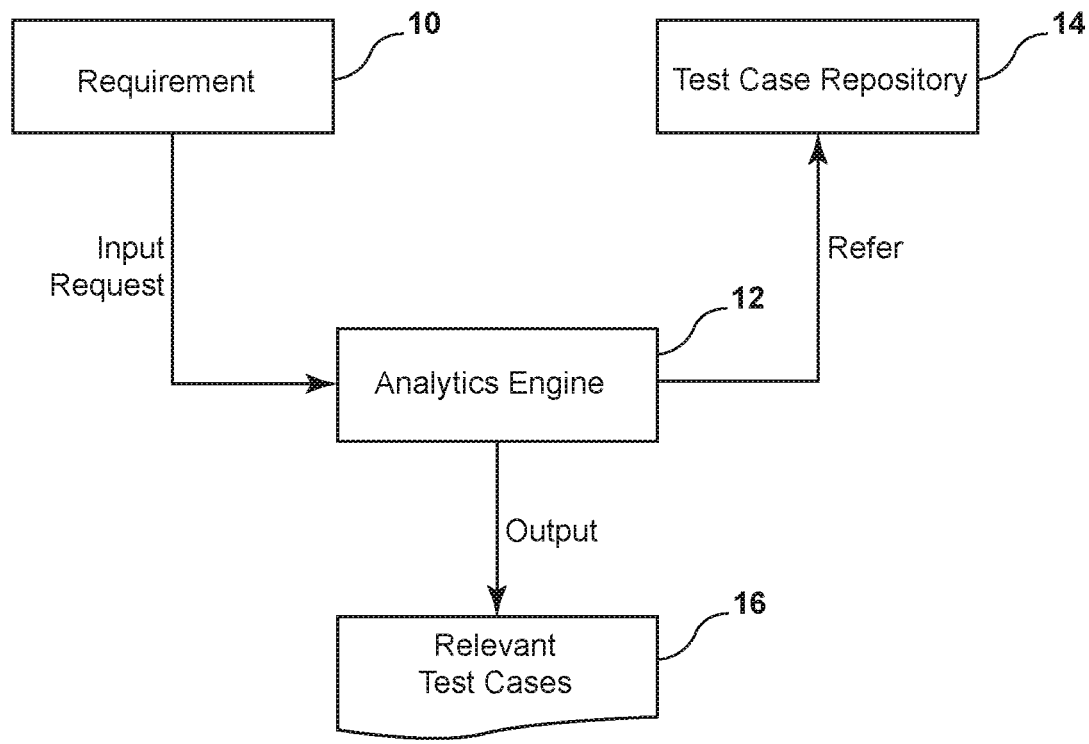
FIG. 2 is an overview of an embodiment of the structure of the smart test case mapping system.

FIG. 2 demonstrates a high-level embodiment of the smart test case mapper tool. In this embodiment the input requirement 10 is fed into an analytics engine 12. The analytics engine may analyze the input in a variety of ways. In this embodiment, the analytics engine applies NLP and machine learning to the input to generate processed output, which is then referred to a test case repository 14 to retrieve matching test cases. The analytics engine at 12 may also refer to a master library to retrieve historical usage information and weightage metrics correlating to the processed output. Further at 14, the analytics engine may apply the historical usage information and weightage metrics to score and recommend the most relevant test case that was retrieved from the test case repository (see 16).

Figure 3:
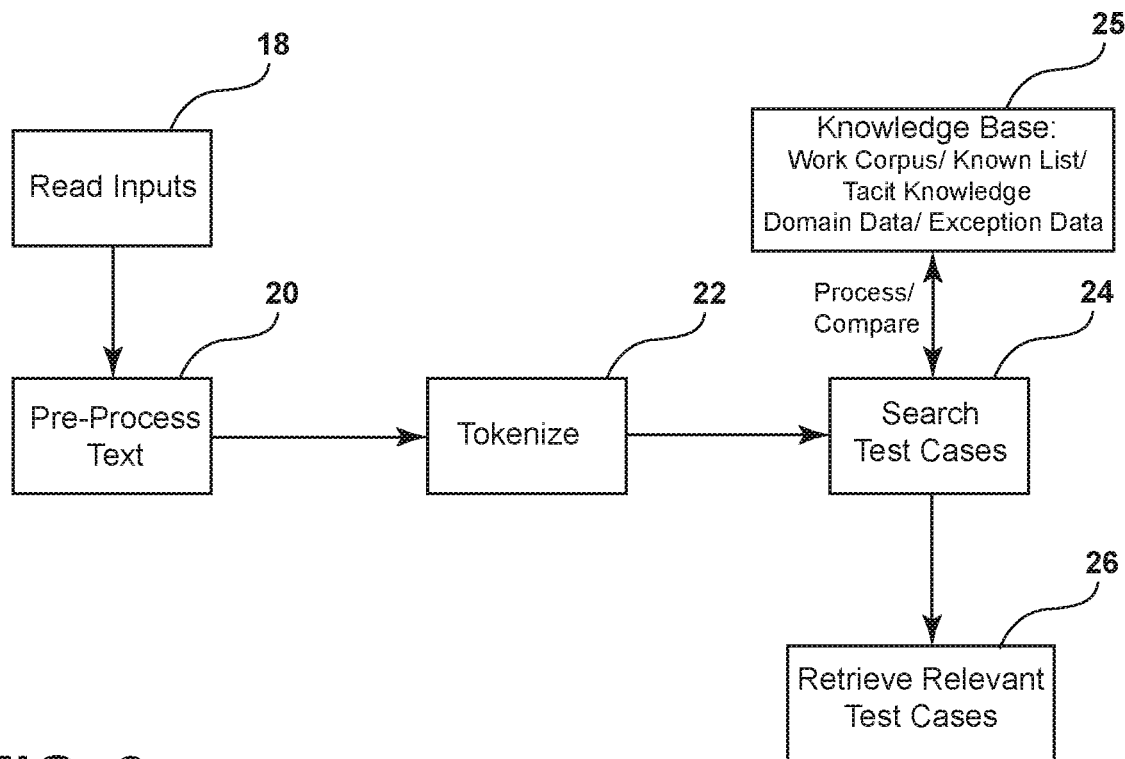
FIG. 3 is a more detailed overview of an embodiment for the utilization of the smart test case mapping system.

FIG. 3 demonstrates a more detailed embodiment of the smart test case mapper tool. The received inputs 18 (e.g., software requirements, change requests, defects) are received as text information or natural language. This text information may be initially parsed by a number of pre-processing techniques as shown in 20. Pre-processing techniques include removing redundant language, vague terms, or low impact terms. Low-impact terms are those that may be too common to increase the uniqueness or effectiveness of the set of tokens after tokenization. Special characters in the input may be disregarded from the input or maintained, depending on the specific application. Alternatively, special characters may be converted into another symbol or input as specified by the user. The text preprocessing and application of natural language processing rules may be performed by a natural language processing module of the smart test case mapping system.

In one embodiment, after pre-processing and at 22, the processed text from 20 may be tokenized through application of an N-gram model in a process referred to as tokenization. In one embodiment, the processed text may be converted into a series of monograms characterized as "search tokens" or "identifier tokens" or simply "tokens." However, in other embodiments, a different, optimal N-gram model may be used, for example, converting the processed text into bigrams, trigrams or "n-" grams. The resulting monograms or "n-" grams may be referred to as "tokens," "search tokens" or "identifier tokens." Embodiments may dynamically identify the optimal N-gram models appropriate for a given text input, software development cycle, or application.

Further, in an embodiment, at 22, the set of search tokens may be optimized by utilizing an industry standard term frequency-inverse document frequency ("TFIDF" or "tf-idf") algorithm to identify commonly occurring tokens and narrow down search token list.

As further shown in FIG. 3 at 24, the search tokens (or monograms or "n-" grams) are referred to the knowledge base 25 within the master library for search maximization. The search tokens are compared against data contained in the knowledge base, which contains information relating to word corpus, known list, tacit knowledge, domain data and exception data. In an embodiment, the word corpus may be a lexical resource that comprises words and related semantic information on those words, such as a dictionary. In an embodiment, tacit knowledge may be skills, ideas and experiences that are associated with tasks, actions or data. In an embodiment, domain knowledge may be knowledge of a specific, specialized discipline or field, in contrast to general knowledge or domain-independent knowledge. Domain knowledge may comprise known lists, which help to build the tacit domain knowledge through the application of customized terms related to the domain under analysis. In an embodiment, exception data may comprise information that is excluded from processing, such as custom stop words or common domain specific words that prevail across the test cases, but would not add value toward the identification of relevant test cases. This data from the knowledge base 25 may be reference to as "domain knowledge."

The domain knowledge from the knowledge base 25 may be considered part of the token set that is referred to the master library and the test case repository, such as at 24, and may be utilized to retrieved relevant test cases (see 26).

Figure 4:
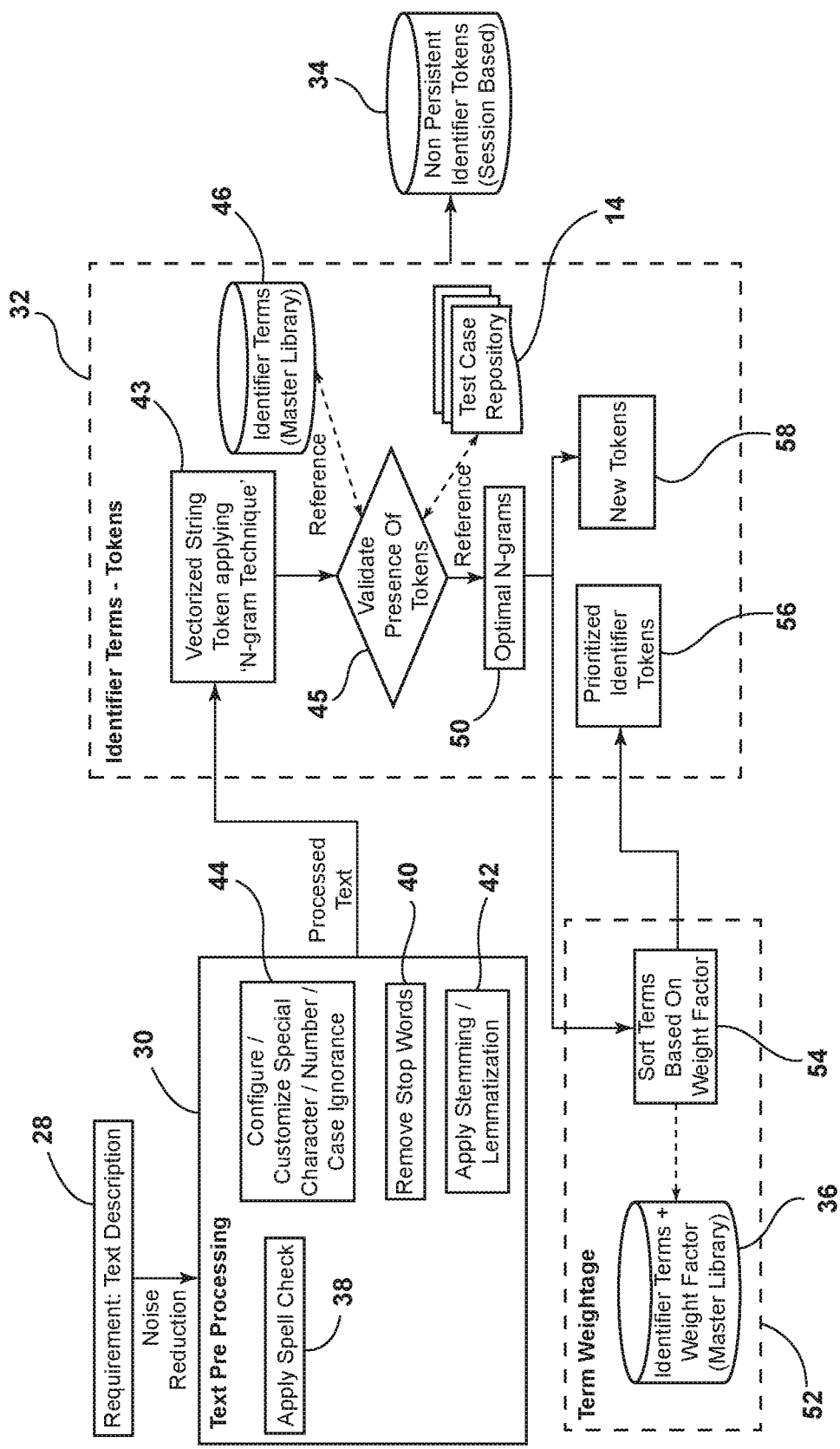
FIG. 4 is a detail of an embodiment of the natural language processing and tokenization of the input.

One embodiment of the text pre-processing module 30 is shown in greater detail in FIG. 4. This pre-processing step may involve "noise reduction," i.e., the removal of redundant language, vague terms, low impact terms, or stop words (see 40, 42, 44). In one embodiment, the pre-processing may require a logic engine applying a spell check function 38 on the text input in order to correct any misspellings or typos in the natural language. However, in another embodiment, pre-determined limits or thresholds may be put into place in order to prevent substantive changes to the input text that would alter the input requirement away from its intended meaning. In one embodiment, the corrected text or processed text may be utilized as the input for the remainder of the inventive method.

In one embodiment at 30, noise reduction may involve removing common words such as prepositions or certain parts of speech. Further, noise reduction may remove special characters, such as question marks, from the input text string. In other embodiments, at 40 and 44, the logic engine may utilize input or rules from a user or systems administrator to selectively allow, ignore, or convert special characters. In a further embodiment at 42, the module applies stemming and lemmatization to the text string to improve the efficacy of the resultant tokens.

One embodiment of an interaction between the token set and the master library and test case repository is shown in greater detail in FIG. 4 at 32. At 32, the processed text from 30 is vectorized at 43 through a vectorizing technique, which may include tf-idf or other industry standard technique, resulting in string tokens. The resulting output may be considered tokens and may be used as search identifiers or search tokens. In the validation step 45, the search tokens are then referred to first the master library 46 and then the test case repository 14. In another embodiment, the tokens may first be referred to the knowledge base in order to identify relevant domain knowledge. Retrieved domain knowledge may then incorporated into the token set and referred to the master library 46 and the test case repository 14.

The tokens are referred to the master library 46 to identify the presence of identical or related persistent terms. If the token already exists as a persistent term, it may be considered a "persistent token." If the token is not found in the master library 46, then it may be considered a "non-persistent token." If the token is not found within the master library 46, then it may be added to the master library 46 on the election by a user during a supervised analytics session. The token is then referred to the test case repository 14 for identification and retrieval of matching test cases.

As shown in FIG. 4, the master library 46 contains historical information related to persistent terms, e.g., previously generated "n-" grams, search tokens or search term identifiers. This historical information may also be considered "quantification factors." In one embodiment, this historical information or quantification factors includes frequency of usage and frequency of a term in a given corpus of text. Additionally, during a supervised analytics session, persistent tokens may be selected by a user. The frequency and weightage of user selections are stored in the master library and associated with the relevant persistent terms. Similarly, a weightage may be assigned to persistent terms based on whether matched persistent tokens are linked to test cases that are ultimately accepted by the user. The quantification factors are associated with the persistent terms within the master library 46, and may be retrieved to form a cluster around the token when the search token is matched with a persistent terms in the master library 46. For example, in an embodiment, the weightage of a persistent term is increased by a count of 1 every time a matched persistent token is selected by a user during a supervised analytics session. Similarly, every time a test cases is accepted by the user, the persistent terms related to the accepted test cases are incremented up by 1. Supervised and unsupervised analytics sessions are described in greater detail in FIG. 5 and accompanying disclosure.

Any un-matched tokens are stored as session-based, non-persistent identifier tokens 34. Non-persistent tokens are stored temporarily for the duration of the session, but in an embodiment, may be deleted from the master library at the conclusion of the unique session if not utilized, or otherwise converted to persistent tokens. During a supervised analytics session, they may be identified as new tokens and may be displayed to the user for their selection in a refined search window. If the user chooses to select the new, non-persistent tokens, the new, non-persistent tokens are converted to persistent tokens and added to the master library 46. In an unsupervised analytics session, the tool may select persistent tokens or convert non-persistent tokens to persistent tokens without the input of a user.

The persistent tokens are referred to the test case repository 14. In an embodiment, a plurality of test cases are stored in the test case repository 14. The stored test cases may have an associated tokenized test case description, configured to match with the search tokens in order to identify associated test cases. Through the referencing to the test case repository 14, the search tokens are correlated to set of tokenized descriptions of pre-stored test cases. The search tokens may be matched to a plurality of test cases based upon the correlation between the search tokens and the tokenized descriptions of pre-stored test cases. The matched test cases may be retrieved and clustered around the relevant search token.

In another embodiment, continuing in FIG. 4 at 50, the N-grams underlying the search tokens (e.g., tokens that are to be matched at the master library 46 or test case repository 14) may be converted to optimal N-grams prior to referencing the test case repository 14.

As demonstrated above at 32, a token, in a non-limiting embodiment a monogram, is successfully matched with a persistent token within the master library 46. The matched persistent token may be a bigram, trigram or quadgram (or an optimal "N"-gram), due to prior supervised and unsupervised analytics efforts having utilized these more lengthy tokens and stored the related usage data in the master library 46. In an embodiment as shown at 50, the monogram may converted to the longer N-gram based upon the matching, and may be known as an optimal N-gram and stored on the optimal N-gram list.

The optimal N-gram may then be referred against the test case repository 14 and return a more relevant test case than if the original monogram had been utilized. For example, as a non-limiting embodiment, the requirement text description 28 may be "As a store manager, I want to require a quantity for each SKU so that we will know how many are on a pallet." Instead of referring the monograms [store] and [manager] against the test case repository, quantification factors and data from the master library may direct a match to the optimal bigram [store manager]. The original monogram is then converted to the optimal bigram [store manager] and is then referred to the test case repository to identify relevant test cases. The resulting list of test cases will be more efficacious as they would not include all matches to the monograms [store] and [manager], but rather only the matches to the optimal bigram [store manager]. In another non-limiting example, instead of seeking to match the monograms [quantity], [each], [sku], where [for] is discarded as part of stop word removal, the optimal quadgram [quantity for each SKU] will identified and the optimal quadgram will be utilized to retrieve relevant test cases.

Within the optimal N-gram list, the individual optimal N-grams may be ordered according to the quantification factors or other usage data as associated with the persistent tokens with the master library 46. At 52 in FIG. 4, the quantification factors (shown in this sub-embodiment at 36) and utilized to order the optimal N-grams within the optimal N-gram list (shown in this sub-embodiment at 54). The ordered list of optimal N-grams may be considered "prioritized N-grams" or "prioritized tokens," such as shown at 56. During a supervised analytics session, a user may designate an unmatched N-gram as an optimal N-gram (see 58). In this manner, if an original monogram (or other n-gram) matches with more than one optimal N-gram, one matched optimal N-gram may take priority over another optimal N-gram.

Figure 5:
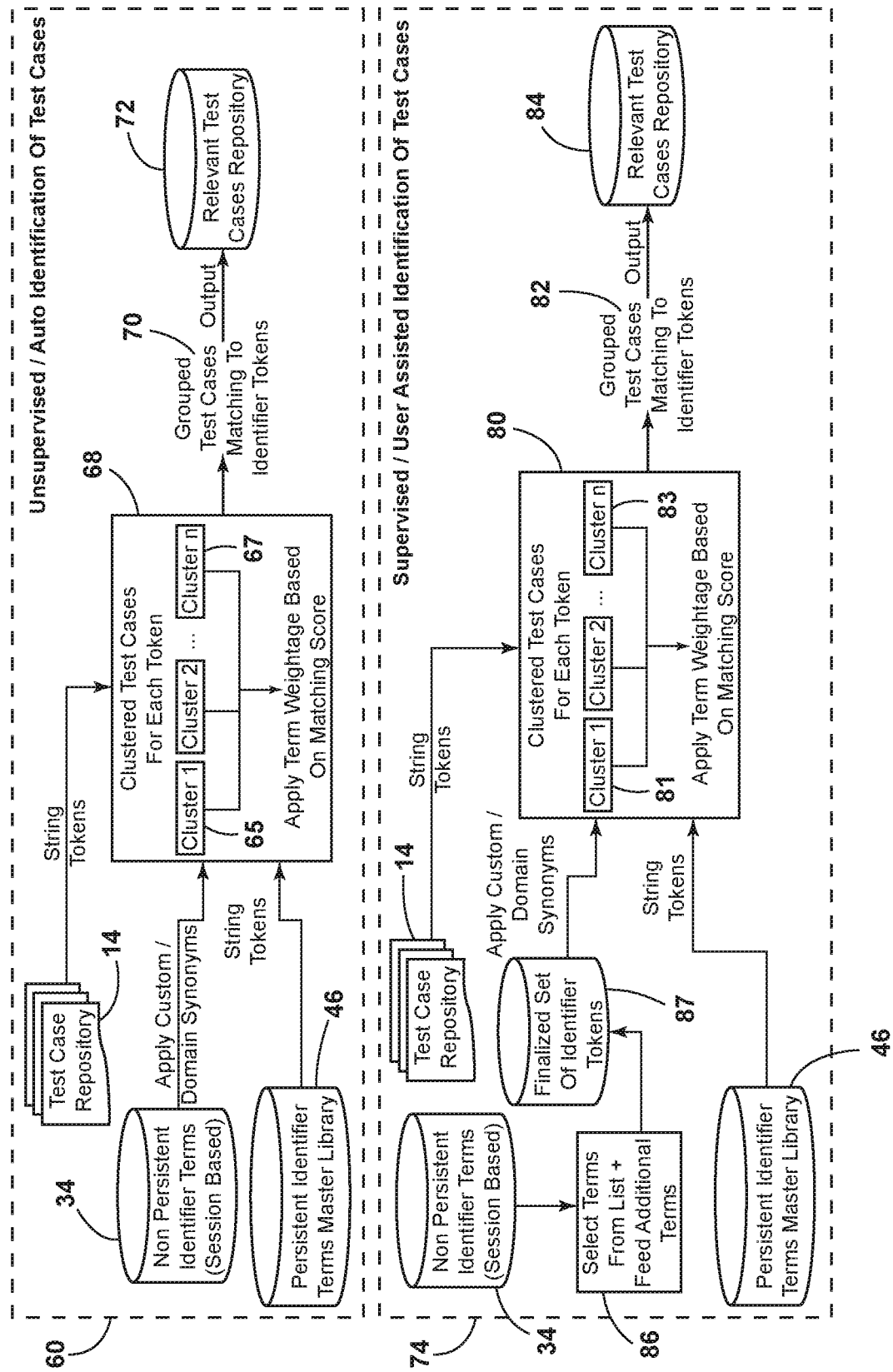
FIG. 5 presents alternative embodiments, supervised and unsupervised, for clustering and identification of test cases.

FIG. 5 shows two non-exclusive embodiments for the identification of test cases in greater detail. These embodiments may be performed by an analytics module of the smart test case mapping system. In one embodiment (the "Unsupervised Embodiment"), in box 60 at 34, the non-persistent tokens (session-based) derived from the pre-processed input text are retrieved. The knowledge base may be referenced for the existence of any domain synonyms correlating to the non-persistent tokens, such as custom or domain synonyms entered or identified by a user during a supervised analytics session. Domain synonyms may be predetermined terms or identifiers that are stored in the master library. Domain synonyms may be a user-built library. The user may form a list of words or tokens relevant to a domain or context. They may also be taxonomic terms that have the same application as the tokens and are pre-identified as being associated with words or terms appearing in the tokens. These domain synonyms, custom terms or taxonomic terms may themselves be tokenized and stored in the master library for continuous reference and use. Hereinafter, any identified domain synonyms associated with tokens may be utilized concurrently with those respective tokens, even if not explicitly stated.

At 46, any associated quantification factors or historical metrics associated with matched persistent terms, as more fully described in FIG. 3, are retrieved. Any non-persistent tokens and any persistent tokens are then referenced to the test case repository 14 to identify relevant test cases.

As shown at 68, for each persistent or non-persistent token that is correlated to a test case, a cluster is formed around that token (for example, clusters at 65 and 67). The cluster comprises all matched test cases associated with that search token. If a test case matches more than one token, then that test case will form part more than one individual cluster. Each cluster also includes quantification factors, such as utilization rates or any other weightage criteria from the master library for the relevant token. Each cluster may also include metrics relating to the number of matched tokens per retrieved test case. Once the token cluster is formed, the test cases are grouped together to form a large cluster to remove redundant test cases from the cluster. As part of removal, the test cases are tagged with any relevant tokens. At 70, the grouped test cases may be outputted to a session-based test case repository 72.

In another embodiment shown in FIG. 5, "Supervised" or "User-assisted" identification of test cases 74 is utilized. In this embodiment, any non-persistent tokens are received at 34. At 86, a user or system administrator may then select any tokens from the retrieved non-persistent tokens for use in searching for test cases at the exclusion of the non-selected tokens. At 87, the knowledge base may be referenced for the existence of any domain synonyms correlating to the selected tokens, such as custom or domain synonyms entered or identified by a user during a supervised analytics session. The result is a finalized set of search tokens.

In another embodiment, the user or systems administrator may manually enter additional custom search terms to act as additional tokens for searching for test cases. The user-custom search tokens may be those tokens disregarded by the natural language processing module during the noise-reduction step (30, in FIG. 4). These user-added tokens may be converted to persistent terms and stored within the master library.

At 46, any associated quantification factors or historical metrics associated with matched persistent terms, as more fully described in FIG. 3, are retrieved. Any selected non-persistent tokens (now converted to persistent tokens) and any persistent tokens are then referenced to the test case repository 14 for identification of relevant test cases. The manually entered or custom tokens are also utilized to match with test cases through correlation of tokenized descriptions of test cases. Matched test cases are then retrieved from the test case repository 14 and associated with the search token, resulting in a cluster at 80 (see resulting clusters at 81 and 83). Each cluster also includes quantification factors, such as match percentage, utilization rates as well as any other weightage criteria from the master library for the relevant token. Once the token cluster is formed, the test cases are grouped together to remove redundant test cases from the cluster. As part of the removal process, the test cases are tagged with any relevant tokens. At 82, the grouped test cases may be outputted to a session-based test case repository 84.

Figure 6:
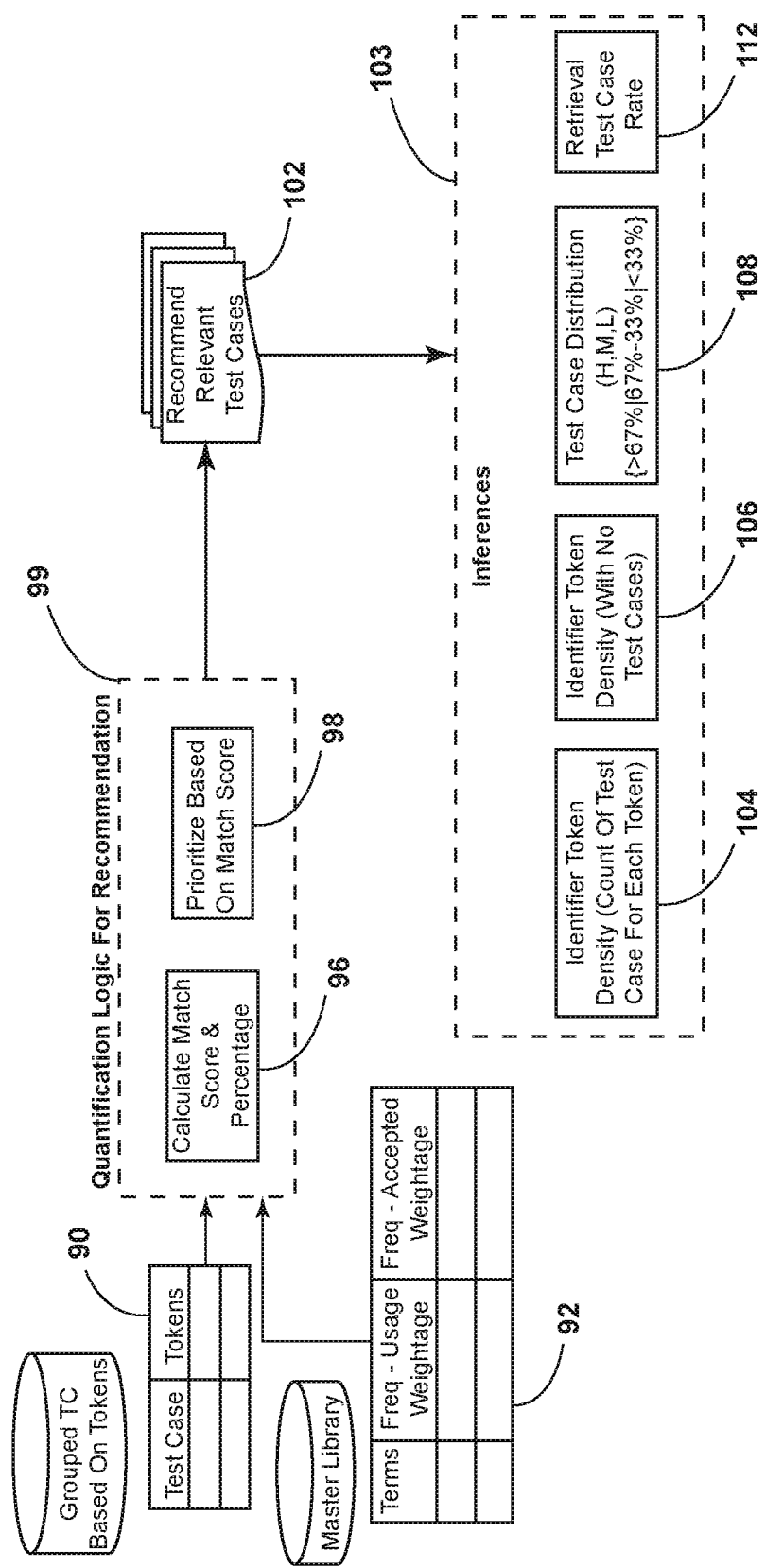
FIG. 6 is an embodiment for the application of quantification logic to the retrieved test cases to score and prioritize the retrieved test cases.

FIG. 6 describes in further detail how the retrieved test cases are scored or prioritized in an embodiment. At 99, weightage factors and other metrics are applied to the test cases retrieved as result of token match, resulting in a prioritized output of retrieved test cases correlating to a recommendation of relevant test cases 102. Through the implementation of quantification logic 96 and 98, the matched test cases within each cluster are scored and subsequently prioritized respective to the other matched test cases.

In one embodiment, the quantification logic normalizes the score of each token by applying the clustered metrics (e.g., at 92), such as, in one embodiment, quantification factors, usage frequency, acceptance frequency, number of tokens matched to a test case, or other form of weighting. The quantification logic scores the token by applying the normalized token score. Each of the test cases are scored based on the summed quantification factors of its respective tagged tokens, such as the match score, the sum of acceptance score (i.e., normalized acceptance frequency), or usage score (i.e., normalized usage frequency). For example, if a test case matches with 3 search tokens, then the score of the test case will be the sum of its matched tokens' scores. The matched test cases are then prioritized based upon the scoring of their clustered token.

In another embodiment, at 90, the retrieved test cases are grouped based upon the number of matched tokens. For example, if a test case had matched with three tokens, then it would be prioritized higher than a test case that had matched only one token. This data and prioritization information is applied to the quantification logic at 99. Also applied to the quantification logic 99 is the historical information or quantification factors from the master library at 92. For any persistent tokens, the quantification factors as described above (e.g., token usage frequency, acceptance frequency) is applied from the cluster to the quantification logic 99.

In yet another embodiment, within 99, starting at 96, the metrics from 90 and 92 are applied to each token, resulting in a normalized weightage. At 98, the normalized score of a token is applied to every matched test case, resulting in a prioritized score for every matched test case. For example, if 40 test cases have been retrieved based upon matches to 3 individual tokens, the 40 test cases would be prioritized based upon the normalized score of their associated token. If the tokens are assigned the following normalized scores: token 1 (0.765), token 2 (0.834) and token 3 (1.000), then the test cases matching to token 3 are prioritized first, followed by the test cases associated with token 2 and then token 1. In the case of the same test case being match with more than one token, in one embodiment, the higher score is applied. At 102 the test cases are recommended or reported to the user in a manner corresponding to the scoring.

In yet another embodiment, more than one method of prioritizing test cases based upon the normalized scores of the matched tokens may be utilized simultaneously, such as enumerated above. The methods of prioritizing test cases may utilize more than one scoring method of tokens. For example, in one non-limiting embodiment, test cases are prioritized first based on the match percentage/score of matched tokens and then by aggregated acceptance score of the respective tokens matched to that test case and then by usage score of the respective tokens matched to that test case.

At 103 in FIG. 6, the test cases are presented to the user along with metadata, scoring detail, quantification logic information, and other data, now collectively referred to as "inferences." In one embodiment, at 104, number of test case matches for each token may be presented to a user. In another embodiment, at 106, an identification of which tokens returned no matching test cases may be presented to a user. In yet another embodiment, at 108, a test case match distribution may be presented to the user. This inference provides the user with what percentage of tokens searched are found within each matched test case. In an exemplary embodiment, the inference may present the matched test cases as: complete match, very close match, near match, and far match. How the matched test cases are assigned a test case match distribution number may be done, in one embodiment, according to the below Table 1:

TABLE 1

| Test case match distribution label | Required percentage of matches out of all searched tokens, in (%). |
|---|---|
| Complete match | 100 |
| Very close match | ≥80 |
| Near match | ≥50 |
| Far match | <50 |

In yet another embodiment at 112, an identification of the rate of retrieval for each matched test case may be presented to the user. The matched test cases, associated scores, prioritization, and relevant test case match distribution label may be reported to the user. The reporting may be performed by a reporting module of the smart test case mapping system.

Figure 7:
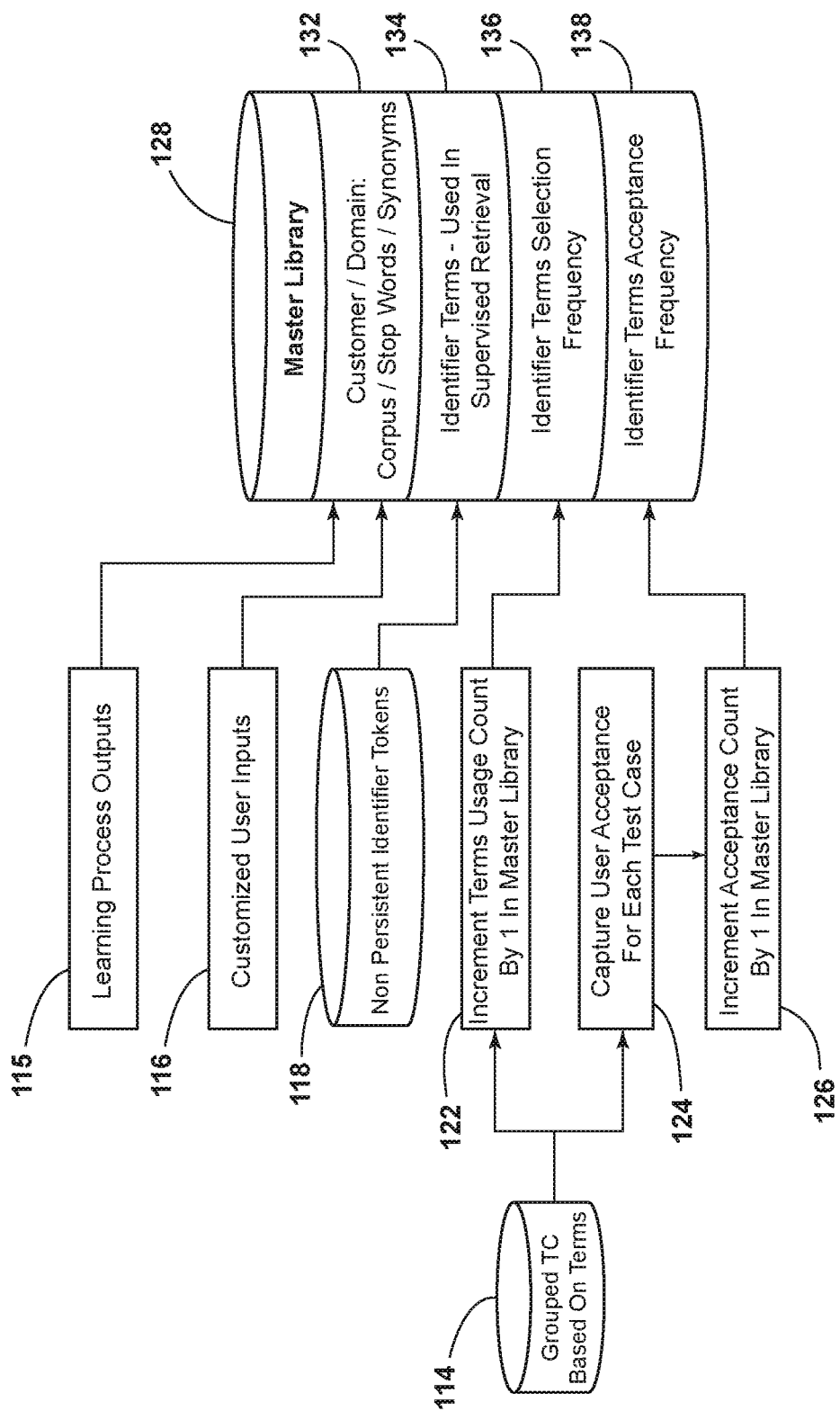
FIG. 7 is a detailed overview of one embodiment of the structure of the knowledge base.

FIG. 7 demonstrates one embodiment of the master library 128, which includes the knowledge database 132. In one embodiment, the master library 128 may be characterized as having four layers. The top layer at 132, which may be referred to as the knowledge base, contains customer terms and domain synonyms, including project or matter specific words that have been stored or pre-determined for use in a discrete matter. Layer 132 may also contain pre-determined stop words for use in noise reduction and NLP. Layer 132 is influenced by learning process 115 outputs such as corpus, stopwords, domain synonyms and customized user inputs 116. The master library 128 may also contain a layer comprising persistent terms (persistent tokens or previously utilized tokens) 134, which may be compared to search tokens. Quantification factors and historical information are also stored in the master library at layer 136 and 138, may be associated with the identifier terms.

In an embodiment, there may also be a layer comprising identifier term (or search tokens) selection frequency, which may be used by quantification logic to score matched test cases 136, and identifier term acceptance frequency, which also may be used by quantification logic to score matched test cases 138. Layer 136 and 138 may be structured to received, and be influenced by, metrics regarding the clustering and grouping of matched test cases around tokens as demonstrated in FIG. 5. For example, if a persistent token is matched to a test case and subsequently clustered with the matched test case (i.e., at 114), the term usage count may increase 122. Further, when a test cases is selected by user, the weighing of any associated or matched persistent or non-persistent tokens may increase.

Through supervised and unsupervised analytics sessions, the master library is continuously built and augmented with new information, usable for future analytics sessions (see, e.g., at 116, 118, 122, 124, and 126). The master library may be updated after every analytics sessions, but also may be updated on a regular or periodic basis. In an embodiment, at 116, any user input received, such as custom domain, lexigraphy or custom stop words, is added and stored in layer 132 of the master library 128. In another embodiment, at 118, non-persistent tokens identified by the user during a supervised analytics session are added and stored in layer 134 of the master library 128, and maybe be stored with existing persistent terms. In yet another embodiment, at 122, if a test case is retrieved from the test case repository and clustered with a search token, then usage frequency for that test case may be updated in layer 136 of the master library 128 to reflect an increase of 1. Similarly, in yet another embodiment at 124 and 126, if a user ultimately selects the test case for utilization, then the then acceptance frequency for that test case may be updated in layer 138 of the master library 128 to reflect an increase of 1

What follows is a non-limiting example of the implementation of a supervised analytics session embodiment (e.g., 74 in FIG. 5) of the smart test case mapping tool. In an implementation of this embodiment, the natural language input containing a software development requirement may be: "As a store manager, I want to require a quantity for each SKU so that we will know how many are on a pallet." One embodiment of the natural language processing module may tokenize the natural language input into a series of monograms: [('As'), ('a'), ('store'), ('manager'), ('I'), ('want'), ('to'), ('require'), ('a'), ('quantity'), ('for'), ('each'), ('SKU'), ('so'), ('that'), ('we'), ('know'), ('how'), ('many'), ('are'), ('on'), ('a')].

In an embodiment, the natural language processing module may implement a spell check, and revise the monogram [('quantiy')] to [('quantity')]. The natural language processing module may implement noise reduction rules to eliminate redundant and low impact terms, resulting the following set of tokens: [('store'), ('manager'), ('require'), ('quantity'), ('pallet')]. These monograms contained in the resultant set of tokens are saved as non-persistent or session based search tokens. In this example embodiment, the natural language processing module is supervised, and therefore the tool receives user selection of certain monograms to the exclusion of other monograms, which may result in the following set of tokens: [('store'), ('quantity'), ('pallet')]. This monograms contained in this resultant set of tokens are saved as persistent search tokens and may be added to the master library within the knowledge database. The monograms ('manager') and ('require') are not saved as persistent search tokens. Any unselected non-persistent tokens are not referred to the test case repository and may be deleted at the end of the session.

In an embodiment, the analytics module references the resultant set of tokens to the master library to match with persistent terms stored within the master library. All historical information, quantification factors and weightage associated with matched tokens and terms are retrieved and clustered with the search token.

The analytics module also references the resultant set of tokens to the test case repository. The search tokens are compared against tokenized descriptions associated with various pre-stored test cases. Any test cases containing identifier terms matching the search tokens are retrieved from the test case repository and clustered around the matched token. All historical information, quantification factors and weightage is then applied to the respective search token cluster, and used to prioritize each retrieved test case in that cluster. Alternatively or concurrently, the test cases in the cluster may be scored based upon the number of search tokens present in the test cases.

The analytics module may then apply quantification logic to clusters, normalizing the score of each test case within each cluster based upon historical information, quantification factors and weightage. Through this application of quantification logic, the analytics module may recommend, through a scored, tiered or prioritized list, the most relevant test case.

The resulting scored test cases are then reported to the user via the reporting module. In an embodiment, the report may contain information regarding the identity and number of matched search tokens. The report may also contain a percentage of matched search tokens out of the total search tokens in the resultant set of tokens. The report may distinguish one matched test case over another matched test case depending on the number of the matched search terms. Alternatively or concurrently, the report may distinguish one matched test over another matched test cases based upon the applied historical information or quantification factors normalized around the value of "1" or via a "Match Percentage."

One embodiment of the reporting may resemble the following Table 2:

TABLE 2

| Test Case | Tokens Matched | Count | Match % | Match |
|---|---|---|---|---|
| Given I am on the Create Page And a tag has already been printed When I enter the tag id of the printed tag Then the Tag Details page will be displayed And the page will display the tag's details Then assignPalletToBay banner should be displayed And the assign pallet to bay banner is dismissed Given a tag record with changes from adding of sku with zero quantity When the user taps the back button (on screen or hardware) | Quantity, Pallet | 2 | 67% | Near |

TABLE 2-continued

| Test Case | Tokens Matched | Count | Match % | Match |
|---|---|---|---|---|
| Then the QTY required Modal open<br>And notify the user with a modal with Title text QTY REQUIRED | | | | |
| Given I am on the Create Page<br>And a tag has already been printed<br>When I enter the tag id of the printed tag<br>Then the Tag Details page will be displayed<br>And the page will display the tag's details<br>Then assignPalletToBay banner should be displayed<br>And the assign pallet to bay banner is dismissed<br>Given a tag record with changes from changing sku quantity<br>When the user taps the back button (on screen or hardware)<br>Then notify the user with a modal with Title Text: Changes not saved!<br>And the Message: You must print a new tag to save changes.<br>And display the following buttons: PRINT and Clear Changes | Quantity, Pallet | 2 | 67% | Near |
| Given I am a user on the tag details page<br>When I scan a bay label<br>Then the system will store the bay location in the database<br>And display the location added successful toast<br>And return the user to the create screen to its initial state<br>When I scan a tag Id<br>Then the Tag Details page will be displayed<br>And the aisle-bay will show the persisted value<br>And assignPalletToBay banner should not be displayed | Store, Pallet | 2 | 67% | Near |
| Given I am on the HOME PAGE<br>When printing is requested where one or more skus is missing a qty<br>Then the QTY required Modal open<br>And notify the user with a modal with Title text QTY REQUIRED<br>And Display Modal Message: All SKUs require a quantity. Please provide.<br>And Display the button OK | Quantity | 1 | 33% | Far |

One embodiment of the reporting may resemble the following. In this embodiment, for the same natural language input as shown above in Table 2, the tokenization and matching process returned the following four relevant test cases as shown in Table 3 below:

TABLE 3

| Test case | Description |
|---|---|
| 1 | Given I am a user on the tag details page<br>When I scan a bay label<br>Then the system will store the bay location in the database<br>And display the location added successful toast<br>When I scan a tag Id<br>Then the Tag Details page will be displayed<br>And the aisle-bay will show the persisted value<br>And assignPalletToBay banner should not be displayed |
| 2 | Given I am on the Create Page<br>When I enter the tag id of the printed tag<br>Then assignPalletToBay banner should be displayed<br>And the assign pallet to bay banner is dismissed<br>Given a tag record with changes from adding of sku with zero quantity<br>When the user taps the back button (on screen or hardware)<br>Then the QTY required Modal open<br>And notify the user with a modal with Title text QTY REQUIRED<br>And Display Modal Message: All SKUs require a quantity. Please provide. |
| 3 | Given I am on the HOME PAGE<br>When printing is requested where one or more skus is missing a qty<br>Then the QTY required Modal open |

TABLE 3-continued

| Test case | Description |
|---|---|
| | And notify the user with a modal with Title text QTY REQUIRED |
| | And Display Modal Message: All SKUs require a quantity. Please provide. |
| | And Display the button OK |
| 4 | Given I have previously selected the (Continue) button for a pallet |
| | When I add yet another department on that same pallet |
| | Then the system will recognize the flag to not ask again and thus NOT |
| | display the message again for that pallet |

In this embodiment, the master library contains historical data and quantification factors for the identified tokens: Manager, Save, Request, Quantity, Store, Pallet that have been tablized into Table 4. In this embodiment, the Usage and Acceptance historical data is normalized into Usage and Acceptance scores for each token.

TABLE 4

| | Count | | Normalized | |
|---|---|---|---|---|
| Terms | Usage | Acceptance | Usage | Acceptance |
| Manager | 3 | 2 | 0.115384615 | 0.095238095 |
| Save | 7 | 2 | 0.269230769 | 0.095238095 |
| Request | 3 | 3 | 0.115384615 | 0.142857143 |
| Quantity | 3 | 5 | 0.115384615 | 0.238095238 |
| Store | 7 | 5 | 0.269230769 | 0.238095238 |
| Pallet | 3 | 4 | 0.115384615 | 0.19047619 |
| Total | 26 | 21 | | |

In this embodiment, the reporting module displays to the user additional detail regarding the scoring of the various matched test cases, as shown below in Table 5.

TABLE 5

| Test Case | Token Matched | Quantity | Store | Pallet | Usage Score | Acceptance Score | Token Match Score |
|---|---|---|---|---|---|---|---|
| 1 | Store, Pallet | | 1 | 1 | 0.3846 | 0.4286 | 67% |
| 2 | Pallet, Quantity | 1 | | 1 | 0.2308 | 0.4286 | 67% |
| 3 | Quantity | 1 | | | 0.1154 | 0.2381 | 33% |
| 4 | Pallet | | | 1 | 0.1154 | 0.1905 | 33% |

*Tokens considered in above cases are Quantity, Store, Pallet.

The reporting module may prioritize the test cases based upon several scoring methodologies that may result in a different recommendation of a test case. For example, the reporting module may prioritize the test case with the highest Acceptance Score (i.e., the metric that measures the amount of times the test case or the underlying tokens were selected to utilized by the user). In another example, the reporting module may prioritize the test case with the Usage Score. (i.e., the metric that measures the amount of times the test case or the underlying tokens matched or retrieved in a Supervised or Unsupervised Analytics session). Additionally, some combination or amalgamation of the various scores may be used to prioritize the test cases. The methodology regarding how the reporting module prioritizes the test cases may be set as a default by an administrator or changed by the user.

What follows is a non-limiting example of the implementation of a Unsupervised embodiment (e.g., 60 in FIG. 5) of the smart test case mapping system. In an implementation of this embodiment, the natural language input containing a software development requirement may be: "Check payment Images>link to check images. Maintain a link to the check image that can be accessed from the receipt." One embodiment of the natural language processing module may tokenize the natural language input into a series of monograms: [('Maintain'), ('a'), ('to'), ('the'), ('check'), ('image'), ('that'), ('can'), ('be'), ('accessed'), ('from'), ('the'), ('receipt')].

In an embodiment, the analytics module references the resultant set of tokens to the master library to match with persistent terms stored within the master library. Any matching persistent tokens are retrieved from the master library along with associated historical information, quantification factors and weightage. Any unmatched tokens are classified as non-persistent tokens. Any non-persistent tokens are not referred to the test case repository and may be deleted at the end of the session.

The analytics module also references the resultant set of tokens to the test case repository. The search tokens are compared against tokenized descriptions associated with various pre-stored test cases. Any test cases containing identifier terms matching the search tokens are retrieved from the test case repository and clustered around the matched token. The historical information, quantification factors and weightage is then applied to the respected search token cluster, and used to prioritize each retrieved test case in that cluster. Alternatively or concurrently, the test cases in the cluster may be scored based upon the number of search tokens present in test case.

The analytics module may then apply quantification logic to clusters, normalizing the score of each test case within each cluster based upon historical information, quantification factors and weightage. Through this application of quantification logic, the analytics module may recommend, through a scored, tiered or prioritized list, the most relevant test case.

The resulting scored test cases are then reported to the user via the reporting module. In an embodiment, the report may contain information regarding the identity and number of matched search tokens. The report may also contain a percentage of matched search tokens out of the total search tokens in the resultant set of tokens. The report may distinguish one matched test case over another matched test case depending on the number of the matched search terms. Alternatively or concurrently, the report may distinguish one matched test over another matched test cases based upon the applied historical information or quantification factors normalized around the value of "1" or via a "Match Percentage."

One embodiment of the reporting may resemble the following Table 6:

TABLE 6

| Test Case | Tokens Matched | Count | *Match % | Match |
|---|---|---|---|---|
| Login into AR system as an agent, Perform a search on check payment receipt number on Dom Express Invoice. Verify the receipt has a link to an image of the check. | Image, payment, check, link | 4 | 57% | Near |
| For all shipments excluding rebills FOR NON-AUTOMATION SHIPMENTS: FOR PAYOR CODE = '2' (Bill Recipient) If the bill to account number is not populated, OR (is populated and not numeric, does not check digit, is equal all zeroes), OR (is carrying the pricing option for a bill-to restriction (20)) If the payment method = '05' (Cash) and the pre-rate amount is valid, or the payment method = '04' (bill external credit card) with a valid credit card number | Payment, check | 2 | 29% | Very far |
| Verify the following communication channel option is available: "Help text" Click on the "Help text" option. Verify the communication channel includes information for the new payment methods (AMEX Express Checkout and PayPal). | Payment, check | 2 | 29% | Very far |
| Using payment remittance stub, pay the account level balance on Dom Express Invoice. Verify that customer should able to pay the account level balance with Payment Remittance Stub | Payment | 1 | 14% | Very far |
| Non Automation shipment Legacy FOR PAYOR CODE = '2' (Recipient) If the shipper account number is not populated, is populated and is not numeric or doesn't pass the check digit routine -- If no account number is located, set the appropriate override-able stat code Online Correction Error 028 SHIP ACCT# - BAD CHECK DIGIT | Check | 1 | 14% | Very far |

*Tokens considered in above cases are check, payment, image, link, maintain, access and receipt.

It should be understood that a processor, particularly a main electronic control unit (i.e., processor), as described herein may include conventional processing apparatus known in the art, capable of executing pre-programmed instructions stored in an associated memory, all performing in accordance with the functionality described herein. To the extent that the methods described herein are embodied in software, the resulting software can be stored in an associated memory and can also constitute the means for performing such methods. Implementation of certain embodiments, where done so in software, would require no more than routine application of programming skills by one of ordinary skill in the art, in view of the foregoing enabling description. Such an electronic control unit may further be of the type having both ROM, RAM, a combination of non-volatile and volatile (modifiable) memory so that any software may be stored and yet allow storage and processing of dynamically produced data and/or signals.

It should be further understood that an article of manufacture in accordance with this disclosure includes a computer-readable storage medium having a computer program encoded thereon for implementing logic and other functionality described herein. The computer program includes code to perform one or more of the methods disclosed herein. Such embodiments may be configured to execute one or more processors, multiple processors that are integrated into a single system or are distributed over and connected together through a communications network, and where the network may be wired or wireless.

Although only certain embodiments have been described above with a certain degree of particularity, those skilled in the art could make numerous alterations to the disclosed embodiments without departing from the scope of this disclosure. Joinder references (e.g., attached, coupled, connected, and the like), are to be construed broadly and may include intermediate members between a connection of elements and relative movement between elements. As such, joinder references do not necessarily imply that two elements are directly connected/coupled and in fixed relation to each other. Additionally, the use of "e.g." throughout the specification is to be construed broadly and is used to provide non-limiting examples of embodiments of the disclosure, and the disclosure is not limited to such examples. It is intended that all matter contained in the above description or shown in the accompanying drawings shall be interpreted as illustrative only and not limiting. Changes in detail or structure may be made without departing from the present disclosure as defined in the appended claims.

Although only certain embodiments have been described above with a certain degree of particularity, those skilled in the art could make numerous alterations to the disclosed embodiments without departing from the scope of this disclosure. All directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments. Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. Additionally, the terms "electrically connected" and "in communication" are meant to be construed broadly to encompass both wired and wireless connections and communications. It is intended that all matter contained in the above description or shown in the accompanying drawings shall be interpreted as illustrative only and not limiting. Changes in detail or structure may be made without departing from the invention as defined in the appended claims.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

While one or more particular embodiments have been shown and described, it will be understood by those of skill in the art that various changes and modifications can be made without departing from the spirit and scope of the present teachings.

What is claimed is:

1. A computerized system for identifying a test case stored in a test case repository, the system comprising:
    a computer comprising a processor and a memory;
    a natural language processing module stored in the memory of the computer and, when executed by the processor, configured to:
        receive an input containing a requirement;
        apply a natural language processing rule to the input to generate a first output; and
        tokenize the first output into a set of tokens comprising a first search token;
    an analytics module stored in the memory of the computer and, when executed by the processor, configured to:
        cluster the first search token with a first quantification metric, whereby the first quantification metric is retrieved from a master database based upon a correlation between the first search token and a first persistent term associated with the first quantification metric;
        cluster the first search token with a first test case, whereby the first test case is retrieved from the test case repository based upon a correlation between the first search token and a tokenized description associated with the first test case;
        calculate a score of the first search token based upon the first quantification metric;
        calculate a score of the first test case based upon the score of the first search token; and
    a reporting module stored in the memory of the computer and, when executed by the processor configured to generate a report comprising the score of first test case.

2. The computerized system of claim 1, wherein the analytics module is further configured to:
    retrieve a domain synonym from a knowledge database based upon a correlation between the domain synonym and the first search token; and
    cluster the domain synonym with a second test case, whereby the second test case is retrieved from the test case repository based upon a correlation between the domain synonym and a tokenized description associated with the second test case.

3. The computerized system of claim 2, wherein the analytics module is further configured to:
    cluster the domain synonym with a second quantification metric, whereby the second quantification metric is retrieved from the master database based upon a correlation between the domain synonym and a second persistent term associated with the second quantification metric;
    calculate a score of the domain synonym based upon the second quantification metric; and
    calculate a score of the second test case based upon the score of the domain synonym.

4. The computerized system of claim 3, wherein the reporting module is further configured to generate the report comprising a prioritization of the first test case and the second test case based upon the score of the first test case and the score of the second test case.

5. The computerized system of claim 1, wherein the set of tokens further comprises a second search token, and wherein the analytics module is further configured to:
    cluster the second search token with a second quantification metric, whereby the second quantification metric is retrieved from the master database based upon a correlation between the second search token and a second persistent term associated with the second quantification metric;
    cluster the second search token with a second test case, whereby the second test case is retrieved from the test case repository based upon a correlation between the second search token and a tokenized description associated with the second test case;
    calculate a score of the second search token based upon the second quantification metric; and
    calculate a score of the second test case based upon the score of the second search token.

6. The computerized system of claim 5, wherein the reporting module is further configured to generate the report comprising a prioritization of the first test case and the second test case based upon the score of the first test case and the score of the second test case.

7. The computerized system of claim 6, wherein the reporting module is further configured to receive a user acceptance of the first test case or of the second test case.

8. The computerized system of claim 1, wherein the analytics module is further configured to optimize the first search token based upon the correlation between the first search token and the first persistent term, wherein the optimize comprises combining the first search token with a second search token of the set of tokens to form a compound search token.

9. The computerized system of claim 1, wherein the analytics module is further configured to:
    detect if no correlation exists between the first search token and the first persistent term;
    display to a user, through a user interface, the first search token;
    receive a user selection, through a user interface, of the first search token; and
    based upon the user selection, convert the first search token into a second persistent term and store in a master library.

10. The computerized system of claim 1, wherein the analytics module is further configured to receive from a user, through a user interface, at least one of a natural language processing rule, a domain synonym, and a quantification metric.

11. The computerized system of claim 1, wherein, after a user acceptance of the first test case is received by the reporting module, the analytics module being further configured to:
update the first quantification metric within the master database based upon at least one of data related to retrieval of the first quantification metric, data related to calculation of the score of the first test case based upon the first quantification metric, data related to the user acceptance of the first test case.

12. A method of identifying a test case from a test case repository, the method comprising:
receiving an input containing a requirement;
applying a natural language processing rule to the input to generate a first output;
tokenizing the first output into a set of tokens comprising a first search token;
clustering the first search token with a first quantification metric, whereby the first quantification metric is retrieved from a master database based upon a correlation between the first search token and a first persistent term associated with the first quantification metric;
clustering the first search token with a first test case, whereby the first test case is retrieved from the test case repository based upon a correlation between the first search token and a tokenized description associated with the first test case;
calculating a score of the first search token based upon the first quantification metric;
calculate a score of the first test case based upon the score the first search token; and
generating a report comprising the score of first test case.

13. The method of claim 12, the method further comprising:
tokenizing the first output into a set of tokens comprising a first search token and a second search token;
clustering the second search token with a second quantification metric, whereby the second quantification metric is retrieved from the master database based upon a correlation between the second search token and a second persistent term associated with the second quantification metric;
clustering the second search token with a second test case, whereby the second test case is retrieved from the test case repository based upon a correlation between the second search token and a tokenized description associated with the second test case;
calculating a score of the second search token based upon the first quantification metric; and
calculating a score of the second test case based upon the score the first search token.

14. The method of claim 13, the method further providing a recommended test case to a user based upon a prioritization of the first test case and the second test case based upon the score of the first test case and the score of the second test case.

15. The method of claim 14, the method further comprising receiving a user acceptance of the first test case or of the second test case.

16. The method of claim 12, the method further comprising:
receiving a user acceptance of the first test case; and
updating the first quantification metric within the master database based upon at least one of data related to retrieval of the first quantification metric, data related to the score of the first test case based upon the first quantification metric, data related to the user acceptance of the first test case.

17. The method of claim 15, the method further comprising updating the second quantification metric within the master database based upon at least one of data related to retrieval of the second quantification metric, data related to calculation of the score of the second test case based upon the second quantification metric, data related to the user acceptance of the first test case or of the second test case.

18. The method of claim 12, wherein the method further comprises:
retrieving a domain synonym from a knowledge database based upon a correlation between the domain synonym and the first search token; and
clustering the domain synonym with a second test case, whereby the second test case is retrieved from the test case repository based upon a correlation between the domain synonym and a tokenized description associated with the second test case.

19. The method of claim 18, wherein the method further comprises:
clustering the domain synonym with a second quantification metric, whereby the second quantification metric is retrieved from the master database based upon a correlation between the domain synonym and a second persistent term associated with the second quantification metric;
calculating a score of the domain synonym based upon the second quantification metric; and
calculating a score of the second test case based upon the score of the domain synonym.

20. The method of claim 12, wherein the method further comprises optimizing the first search token based upon the correlation between the first search token and the first persistent term, wherein the optimizing comprises combining the first search token with a second search token of the set of tokens to form a compound search token.

* * * * *